United States Patent [19]

Sekiguchi

[11] 3,973,083
[45] Aug. 3, 1976

[54] ROTARY DIAL DEVICE FOR A TELEPHONE SET

[75] Inventor: Koichi Sekiguchi, Asaka, Japan

[73] Assignee: Iwasaki Tsushinki Kabushiki Kaisha, Japan

[22] Filed: Jan. 30, 1974

[21] Appl. No.: 437,784

[30] Foreign Application Priority Data
Jan. 31, 1973 Japan.................................. 48-11913
Feb. 27, 1973 Japan.................................. 48-22688

[52] U.S. Cl............................................... 179/90 D
[51] Int. Cl.²............................................ H04M 1/66
[58] Field of Search............ 179/90 D, 90 R, 18 DA, 179/18 D, 27 CB

[56] References Cited
UNITED STATES PATENTS

| 2,767,249 | 10/1956 | MacDonald.................... 179/18 DA |
| 2,914,616 | 11/1959 | Lomax........................... 179/18 DA |
| 3,511,939 | 5/1970 | Aikawa........................... 179/90 D |
| 3,748,402 | 7/1973 | Yussen............................ 179/90 D |
| 3,757,055 | 9/1973 | McCann et al.................. 179/90 D |
| 3,798,381 | 3/1974 | Piacente et al................. 179/18 DA |

Primary Examiner—Kathleen H. Claffy
Assistant Examiner—G. Brigance
Attorney, Agent, or Firm—Robert E. Burns; Emmanuel J. Lobato; Bruce L. Adams

[57] ABSTRACT

A rotary dial device for a telephone set, in which an additional function of preventing a toll dialling is provided. In accordance with this invention, a contact is further attached to an usual dial to classify dial impulses so that when a number "1," one of numbers "2" to "9," and a number "0" are dialled, one, two and three pulses are produced respectively. The dialling function subsequent to the first dialling number "0" and the first and second dialling numbers "10" is effectively stopped by counting the classified pulses.

4 Claims, 5 Drawing Figures

ROTARY DIAL DEVICE FOR A TELEPHONE SET

This invention relates to a dial device for a telephone set and, more particularly, to a DC pulse rotary dial with an additional function of preventing a toll dialling utilizing pulse counting.

At present, toll dialling can be performed by the direct distance dialling started by a first dialling number "0" and by a request to the toll board of a number "100" or "106." Conventional types of devices adapted to prevent such toll dialling are usually designed so as to inhibit only the first dialling rotation for the direct distance dialling or to prevent the request to the toll board of the number "100" or "106." The latter conventional device requires the complicated machining, so that the fabrication of such device necessitates large-scale manufacturing devices, such as a mold, and the manufacturing cost is inevitably high. Further, many mechanical parts are employed as their construction parts so that this leads to defects such as bulkiness and an increase in weight and in trouble times.

An object of this invention is to provide a rotary dial device for a telephone set, which is simple in construction but capable of readily preventing toll dialling.

To attain the above object, in the dial device of the present invention, a contact is further attached to the usual dial to classify dial impulses so that when a number "1," one of numbers "2" to "9", and a number "0" are dialled, one, two and three pulses are produced respectively. Accordingly, the dial device of this invention is constructed such that when the output pulses are controlled by a counter or the like formed by a transistor circuit, the dialling function subsequent to the first dialling number "0" and the first and second dialling numbers "10" can be stopped. Namely, this invention is based on counting and controlling of the dial impulses with a counter formed by an electronic circuit such as a transistor circuit. However, direct counting of unclassified dial impulses from the usual dial device introduces complexity in the circuit construction, which results in lowering of reliability and an increase in power consumption. To avoid such disadvantages, in the present invention, the dial pulses are classified in the following manner. Namely, the dial contact is designed so that when a dialling number "1,"0 one of dialling numbers "2" to "9" and a dialling number "0" are dialled, one, two and three pulses are produced respectively.

For providing the toll-dialling preventing function in the present invention, a talking circuit and the dial device of the telephone set are switched by a continuous transfer contact, so that the talking circuit is normally connected to a telephone line through a slow-releasing relay. By inserting the contact of the slow-releasing relay in series with an impulse contact provided in the dial device, generation of the dialling impulses is effected only when the relay is actuated and, in the case of abnormal toll dialling, the relay is made inactuative, whereby the impulse contact is turned-OFF to stop the abnormal toll dialling.

The principle, construction and operations of this invention will be clearly understood from the following detailed description taken in conjunction with the accompanying drawings, in which.

Figure 1:
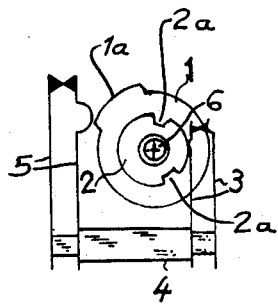
FIG. 1 is a plan view illustrating the principal part of one example of the dial device of this invention.

With reference to FIG. 1, the dial device of this invention will be described for the main part thereof. In FIG. 1, a reference numeral 1 indicates a main cam of the dial for providing a minimum pause; 2 designates a sub-cam for achieving the classification in accordance with this invention; 3 represents a contact controlled by the cam 2; and 4 identifies a contact support. A minimum pause contact 5 is also mounted on the contact support 4 and is coactive with the main cam 1. Both the main cam 1 and the sub-cam 2 are mounted on a dial main shaft 6 to rotate therewith as the dial is operated. Other dial components are known per se and hence omitted. The type 600 dial of the Nippon Telegraph & Telephone Public Co., or the dial disclosed in U.S. Pat. No. 3,108,159 are representative of available dials, and may be used in conjunction with the present invention.

Figure 2:
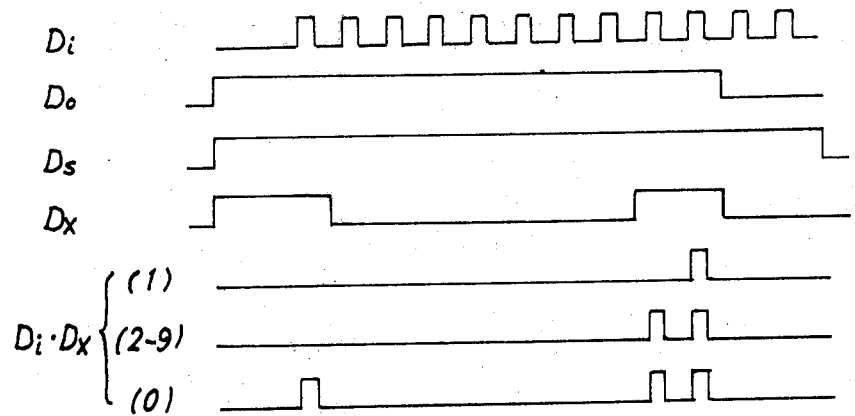
FIG. 2 is time charts explanatory of the operations of the dial device of this invention.

In time charts of FIG. 2, a reference character $D_i$ shows the output pulses of a dial impulse contact; $D_o$ shows an output pulse of a minimum pause contact; and $D_s$ shows an output pulse of a shunt contact, which is a continuous contact in this invention. A reference character $D_x$ shows output pulses of the contact disposed as indicated by the reference 3 in FIG. 1. The logical product of the pulses $D_x$ and $D_i$ is one of time charts indicated by $D_x \cdot D_i$ in FIG. 2. In FIG. 2, a time chart $D_i \cdot D_x$ (1) shows the operation in the case of a dialling number "1"; a time chart $D_i \cdot D_x$ (2–9) shows the operation in the case of one of dialling numbers 2 to 9; and a time chart $D_i \cdot D_x(O)$ shows the operation in the case of a dialling number "0."

The lateral surface of main cam 1 includes a raised land 1a which closes the minimum pause contact 5 during a portion of one rotation of the dial. The minimum pause contact 5 is open throughout the rest of the dial rotation. Conversely, the lateral surface of sub-cam 2 includes indentations 2a which allow the contact 3 to open during a portion of the dial rotation. Contact 3 is otherwise normally closed. The relative angular positions of the main cam land 1a and the sub-cam indentations 2a are such that the minimum pause contact 5 is opened prior to the first dial impulse and the contact 3 is opened during the first and second dial impulses, and during the last dial impulse.

As will be evident from the foregoing, the sub-cam 2 and the contact 3 shown in FIG. 1 are added to a known dial in accordance with this invention and, at the same time, the logical product of the contact 3 and the impulse contact $D_i$ is obtained so that an output indicative of the product is employed as a pulse signal for counting.

Figure 3:
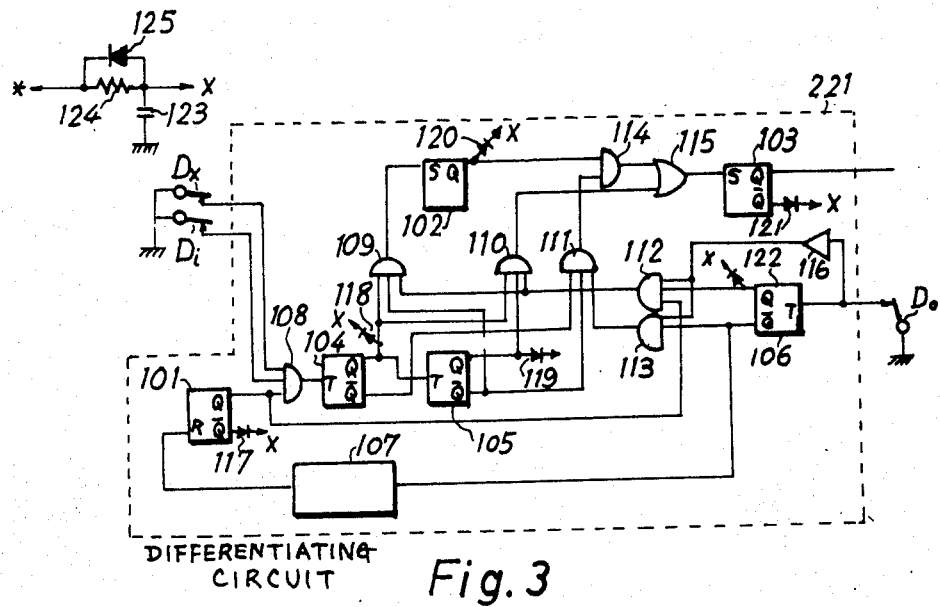
FIG. 3 is a circuit diagram illustrating an example of the dial device control circuit of this invention.

Next, a description will be given of an example of the construction for controlling the prevention of toll dialling by the use of the above-mentioned pulse signal and an example of the operations therefor. In FIG. 3, there is illustrated one example of a control circuit 221 and, in FIG. 4, one example of this invention as being applied to a toll-dialling preventing telephone set which employs the control circuit 221.

In FIG. 3, reference numerals 101, 102 and 103 indicate RS flip-flops (hereinafter referred to as RSFF) and 104 and 105 designate trigger flip-flops (hereinafter referred to as TFF), which constitute a scale-of-4 counter. A reference numeral 106 represents a TFF; 107 denotes a differenting circuit; 108, 109, 110, 111, 112, 113 and 114 identify AND gates; 115 indicates an OR gate; and 116 designates an inverter. A reference character $D_i$ represents a dial impulse contact; $D_x$ identifies a contact for classification; and $D_o$ denotes a minimum pause contact. Reference numerals 117 to 121 designate diodes; 123 indicates a capacitor; 124 identifies a fixed resistor; and 125 identifies a diode. The mark * corresponds to the position indicated by the mark * in FIG. 4.

With reference to FIG. 3, the operations of the control circuit 221 will be described below.

1. In the case of first dialling number "0":

As the initial state when a power source is connected to the circuit of FIG. 3, those terminals Q or Q of the flip-flops 101, 102, 103, 104, 105 and 106 (Hereinafter referred as FF), which are respectively connected to the diodes 117, 118, 119, 120, 121 and 122 and the capacitor 123, are set at a low level (hereinafter referred as a level L). Under such conditions, upon rotation of the dial, since the contacts $D_i$ and $D_x$ and the terminal Q of the RSFF 101 are at a high level (Hereinafter referred as a level H), three impulses are applied to the output terminal of the gate 108 and the input terminal T of the TFF 104 and then counted by the counter constituted by the TFF 104 and 105, so that the terminal Q of the TFF 104 and the terminal Q of the TFF 105 are both altered to the level H. On the other hand, the contact $D_o$ breaks simultaneously with the dial rotation and the output from the inverter 116 is lowered down to the level L, so that the gates 112, 109 and 110 are closed. Accordingly, the RSFF 102 is never set in the course of counting by the counter. Then, when the dial has returned to its initial position and the contact $D_o$ has closed again, the TFF 106 is reversed and the signal level of the output terminal of the inverter 116 is raised up to the level H, so that the gates 112 and 110 are opened. Consequently, the pulse signal from the counter is applied through the gates 110 and 115 to the RSFF 103 to reverse it to lower the signal level of its terminal Q down to the level L, thereby preventing generation of the dial pulses.

2. In the case of the first dialling number "1" and the second dialling number "0":

The initial condition is the same as that in the case (1). Upon dialling of the dialling number "1," the gates 112 and 109 are opened in the same manner as in the case (1), by which the RSFF 102 is reversed and the signal level of its terminal Q is raised up to the level H. Then, upon dialling of the dialling number "0," the counter continues its counting operation and the level of the terminals Q of the TFF 104 and 105 are raised up to the level H. Next, the TFF 106 reversed by the contact $D_o$ at the time of the first dialling is again reversed by the second dialling, that is, restored to its initial state. As a result of this, the gates 113 and 111 are opened and the gate 114 is also opened in response to the pulse signals from the TFF 106 and the RSFF 102. The output of the gate 114 is raised up to the level H, which is applied through the gate 115 to the RSFF 103 to reverse it to lower the output of its terminal Q down to the level L. Further, when the level of the terminal Q of the TFF 106 is altered in the order of H-L-H by twice make-to-break switchings of the contact $D_o$, that is upon completion of the second dialling, the RSFF 101 is reversed by a differentiated output derived from the terminal $\overline{Q}$ of the TFF 106. Therefore, the gate 108 is closed to prevent the application of the dial impulses after a third dialling to the counter.

Thus, in the cases (1) and (2), the RSFF 103 is reversed to prevent pulse generation by dialling. In the cases other than those (1) and (2), for example, in the case of first dialling of one of numbers "2" to "9," and in the case where the first dialling number is "1" and the second dialling number is one of numbers "1" to "9," since no gates corresponding to them are provided, no RSFF are reversed.

In short, in the case where the indication by the counter is "3" at the first dialling or in the case where the indication thereof is "1" at the first dialling and "4" at the second dialling, the RSFF 103 is reversed. The counter is constructed to achieve counting until the second dialling. The counter is a scale-of-4 ring counter.

The following table 1 shows the relationships between the dialling numbers of the first and second diallings and the indication of the counted states under the conditions mentioned above.

Table 1

| Kinds of dialling numbers | Indication by counter First dialling | Second dialling |
|---|---|---|
| First dialling:one of "2" to "9" Second dialling:one of "0" to "9" | 2 | 3,4 or 1 |
| First dialling: "0" Second dialling:one of "0" to "0" | 3 | 4,1 or 2 |
| First dialling: "1" Second dialling: "0" | 1 | 4 |
| First dialling: "1" Second dialling: one of "1" to "9" | 1 | 2 or 3 |
| First dialling: one of "2" to "9" Second dialling: "0" | 2 | 1 |
| First dialling: one of "2" to "9" Second dialling: "1" | 2 | 3 |

In the Table 1, only the positions marked with circles satisfies the foresaid condition. It appears from this Table 1 that the toll dialling is prevented only when the first dialling number is "0" or when the first dialling number and the second dialling number are "1" and "0" respectively.

Figure 4:
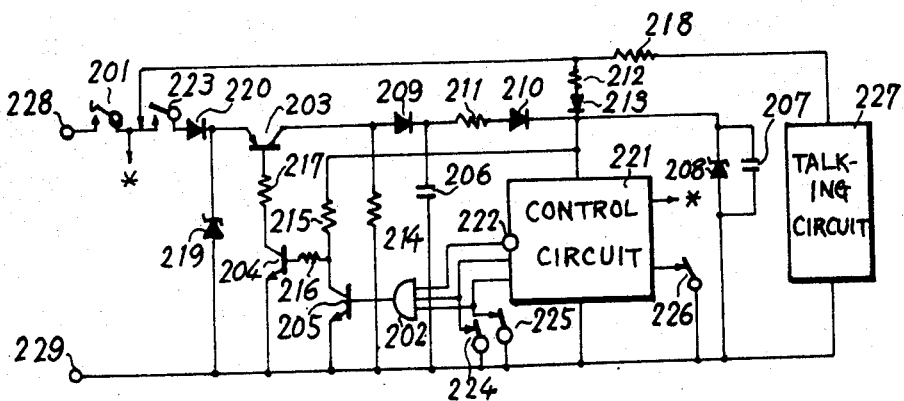
FIGS. 4 and 5 are circuit diagrams showing two alternative embodiments of the complete dial device of this invention.

With reference to FIG. 4, a description will be given of the construction and the operation of the toll-dialling preventing dial device employing the control circuit 221 described above with regard to FIG. 3. In FIG. 4, a reference numeral 201 indicates a hook switch; 202 designates an AND gate; 203, 204 and 205 identify transistors; 206 and 207 represent capacitors; 208 ad 219 denote Zener diodes; 209, 210, 213 and 220 show diodes; 211, 212, 214, 215, 216, 217 and 218 refer to fixed resistors; 221 indicates the control circuit shown in FIG. 3; 222 designates an output terminal of the terminal Q of the RSFF 103 shown in FIG. 3; and 223, 224 and 225 represent contacts of the dial. The contact 223 is the shunt contact $D_s$ which is switched simultaneously with the dial rotation as restored to its initial position upon returning of the dial to its initial position. The contact 224 is the contact $D_x$ for classification, and the contact 225 is the impulse contact $D_i$. A reference numeral 226 identified the aforesaid minimum pause contact $D_o$; 227 denotes a talking circuit; and 228 and 229 indicate line terminals.

In the circuit of FIG. 4, when a handset (not shown) is taken out, the hook switch 201 is closed to supply a current to the talking circuit 227. On the other hand, a current is supplied to the control circuit 221 through the resistor 212 and the diode 213. In this case, since the control circuit 221 is in its initial state, the signal level of the interminal 222 assumes the level H. Then, if the dial is rotated and released, the contact 223 is switched from the talking circuit to the dial to provide the supply of a current to the control circuit 221 through the contact 223, the transistor 203, the diode 209, the resistor 211 and the diode 210. In the case of dialling within such a range that the signal level of the terminal 222 of the control circuit 221 may not be lowered to the level L, the dial impulses by the contacts 224 and 225 are applied through the gate 202 to the transistors 205, 204 and 203 to ON-OFF control them in synchronism with the dial contacts 224 and 225. Since the current is supplied to the control circuit 221 through the transistor 203 as referred to above, this ON-OFF control causes a fluctuation in the power source voltage of the control circuit 221 to impede the stable operation of the circuit 221. To avoid this, smoothing is effected by the capacitors 206 and 207. The diode 208 need not always be provided but it serves to provide for enhancing stability of the operation.

In FIG. 4, a DC impulse current is flowed through the transistor 203 and the fixed resistor 214 to enable generation of the dial impulse in response to ON-OFF operation of the transistor 203 in synchronism with the dial contacts 224 and 225.

If the dialling is performed for a number "0" or numbers "10," the signal level of the terminal 222 is lowered down to the level L, as described previously. Even if the gate 202 is closed and the contacts 224 and 225 are ON-OFF switched, the transistor 203 is not ON-OFF switched. Consequently, dialling becomes impossible. The control circuit 221 is returned to its initial state in the following manner. Namely, when the handset is hooked on the telephone set, the hook switch 201 is turned-OFF to cut off the power supply from the line terminals 228 and 229 so that the capacitor 123 shown in FIG. 3 is discharged through the diode 125 and the resistor 218, the talking circuit and so on in FIG. 4. Consequently, when the hook switch 201 is turned-ON again, the control circuit 221 can be brought into its initial state.

The Zener diode 219 is provided for protecting the transistor 203 and the circuit of FIG. 4 from a surge voltage which is applied from line terminals 228 and 229.

Further, if the terminal 222 and the gate 202 are disconnected from each other by the use of a contact such as a key switch, dialling for any numerals can be achieved. Therefore, this toll-dialling preventing telephone set can also be used as an ordinary telephone set by the above disconnecting operation with a key switch.

In the Examples shown in FIGS. 3 and 4, the three groups of the dialling numbers "1," "2 to 9" and "0" correspond to one, two and three output pulses respectively. However, since it is sufficient that the three groups correspond to different numbers of pulses respectively, it is also possible to cause the three groups to correspond to the pulse numbers two, three and four or three, four and five respectively. This can be achieved by designing the shape of the cam 2 so that the width of the righthand one of the pulses $D_r$ in FIG. 2 may be increased. Usually, the last two ones of the pulses $D_i$ are not used for obtaining a minimum pause but, in the case of this invention, they are employed for detecting toll dialling, and hence can be used regardless of the minimum pause.

As has been described in the foregoing, the present invention does not require much machining of the dial portion and only require addition of the sub-cam and the contacts, so that the toll dialling preventing type telephone set need not be manufactured for special service only as in the conventional art and can be produced only by additional machining of some parts of telephone sets now mass-produced. Accordingly, the telephone set can be fabricated with ease and at low cost.

Figure 5:
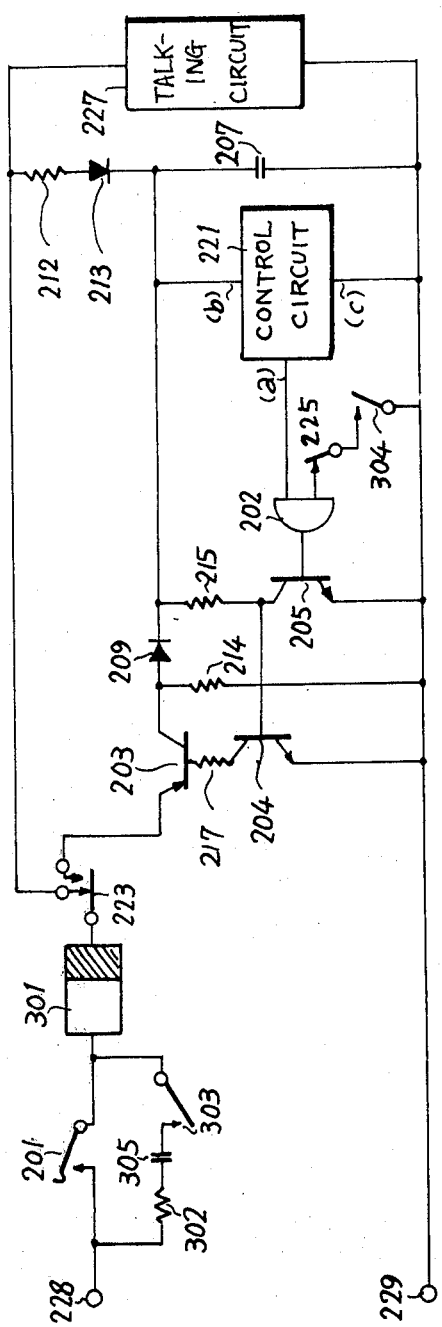

FIG. 5 illustrates another example of this invention, which has a function of preventing the toll dialling even in the case of abnormal dialling. A reference numeral 301 indicates a slow-releasing relay; 302 designates a fixed resistor; 303 and 304 represent contacts of the slow-releasing relay 301; and 305 identifies a capacitor. The circuit elements corresponding to those in FIG. 4 are marked with the same reference numerals.

In FIG. 5, the terminals 228 and 229 are connected to a pair of telephone lines. If handset (not shown) is taken out, the hook switch 201 is turned-ON, so that a DC current flows in the talking circuit 227 through the hook switch 201, the relay 301 and the contact 223, whereby the relay 301 is actuated and the contacts 304 and 303 are turned-ON. In this case, the current flows in the talking circuit 227 and, at the same time, flows through the resistor 212 and the diode 213 to the elements 215, 205, 202, 225, 304, 221 and 207 connected thereto respectively.

Then, upon rotation of the dial, the contact 223 is switched from the talking circuit 227 to the dial pulse generating circuit, which is constituted with the elements 203 to 221 and 207, and the current is supplied to this dial pulse generating circuit.

The operation of the dial pulse generating circuit will be described. When the dial rotation is achieved, a voltage has already been applied to the capacitor 207 as mentioned above and charged therein. At this time, the contact 223 is switched. On the other hand, the transistor 205 is in its off-state because no base current is applied thereto through the gate 202 and the contacts 225 and 304. Accordingly, a base current of the transistor 204 is flowed through the resistor 215, so that the transistor 204 is turned-ON at its collector-emitter path. Consequently, since the transistor 203 is also turned-ON, the current flows from the terminal 228 to the terminal 229 through the contact 201, the relay 301, the contact 223, the transistor 203 and the resistor 214. In this case, the value of the resistor 214 is proper to be about 200 to 300 ohms. Further, the winding resistance of the relay 301 is proper to be in the range of 100 to 200 ohms and, under this condition, the DC resistance value viewed from the terminals 228 and 229 is several hundred ohms, which is sufficient for driving a switch board. When the current flows to the resistor 214, a voltage is produced and applied to the elements 215 to 221 and 207 through the diode 209. Consequently, the transistor 20 self-holds its ON-state even if the current from the elements 212 and 213 is interrupted.

The control circuit 221 is a circuit adapted such that, in a case where the preset toll dialling number or numbers such as the first dialling number "0" or the first and second dialling numbers "1" and "0" are dialled, the number of dial pulses produced is counted, whereby the signal level of the output terminal (a) is altered from its initial high level to a lower level. Reference characters (b) and (c) denote the power source input terminals of the control circuit 221.

If, a number other than the aforementioned toll dialling numbers is now dialled after the handset is taken out, the signal level of the erminal (a) is at the high level. Accordingly when the contact 224 is ON-OFF switched by releasing the dial, the transistor 205 is turned ON-and-OFF at its collector-emitter path, so that the current flowing from the terminal 228 to the terminal 229 through the contact 201, the relay 301, the contact 223, the transistor 203 and the resistor 214 is ON-OFF switched in synchronism with the dial impulse contact 225. Namely, generation of the dial impulse is made possible.

If the toll dialling number is dialled, the signal level of the terminal (a) is lowered, so that even if the contact 225 is ON-OFF switched, the transistor 203 is not ON-OFF controlled. Therefore, toll dialling can be prevented.

In such a circuit operation as described above, the control circuit 221 operates in synchronism with the generation of the pulses by dialling, so that if the toll dialling number is dialled, the control circuit 221 operates without fail and toll dialling can be prevented.

Further, as described previously, in the operation combined with the operation of the switch board, it is possible to fully exhbit the toll dialling preventing function in the following cases (1), (2) and (3), too, by the following operations.

1. In the case of ON-OFF controlling the hook switch 201 in the similar manner as the normal dialling:

The contact 303 is turned-ON in response to the actuation of the relay 301. Now, even if the hook contact 201 is ON-OFF switched, the current flowing across the terminals 228 and 229 is not ON-OFF controlled for the following reasons. Namely, if the relay 301 has a slow-releasing characteristic longer than 100 milli-seconds by way of example, when the hook switch 201 is ON-OFF controlled at intervals less than the time 100 milli-seconds, a current flows through its contact for a certain period of time (dependent upon the capacity of the capacitor) during the OFF-state of the hook switch, so that no interruption of the current flowing across the terminals 228 and 229 occurs. Consequently, generation of the dial impulses by the hook switch 201 is prevented.

2. In the case where, after a dialling number other than the aforesaid toll dialling numbers is dialled, the dial is released slowly on purpose so that the dial impulse contact 225 may be held in its break state for a long period of time to restore the switch board:

As a result of its slow-releasing characteristic, the relay 301 is not restored by the interruption of current at a speed of the ordinally dialling. However, if the dial is slowly released on purpose for a period of time long enough to restore the switch board, the relay 301 is also restored. Accordingly, the contact 304 is opened, so that even if the contact 225 is ON-OFF controlled, the transistor 203 is not ON-OFF controlled.

3. In the case where the dial is rotated after the hook switch 201 is held in its OFF-state and, during releasing the dial, the hook switch is turned-On and then dialling is effected:

If the dial is rotated to switch the contact 223 to the dial pulse generating circuit before the hook switch 201 is turned-ON, the following two operations are achieved.

a. If the capacitor 207 has a charged voltage, the contact 304 is in its OFF state, so that the transistor 205 is turned-OFF. Consequently, the transistor 203 is also turned-OFF.

b. If the capacitor 207 has no charged voltage, since no current is applied to the base of the transistor 204, this transistor 204 is turned-OFF at its collector-emitter path and the transistor 203 is also turned-OFF. Accordingly, in such a case, dial pulse generation is impossible.

As has been described in the foregoing, the defects of the conventional pulse counting type toll dialling preventing dial device can be all removed by adding only one slow-releasing relay, so that the combined use of the above-mentioned dial device and the electronic counter in accordance with this invention is of great utility in practice.

What I claim is:

1. In a DC pulse rotary dial device for a telephone set of the type having a rotary dial; a plurality of cams mounted for rotation with said dial; and a plurality of contacts cooperative with said cams to open and close upon rotation of said cams; the improvement which comprises: a contact; and a cam cooperative with said contact and having a profile effective to change the contact state to classify dialed digits into one of three groups respectively comprised of the digits "0," "1," and "2" through "9."

2. In a rotary dial device according to claim 1, wherein said contact is normally closed and said cam profile is effective to open said contact during the generation of dial pulses corresponding to the digits "0," "1," and "2."

3. A dial device according to claim 1, further including a counter for counting the dial pulses, a pause cam contact electrically coupled with the counter for holding the counter in the operable state until two dial rotations are achieved after a hook switch of the telephone set is turned-ON, a first flip-flop and a first gate both controlled by the pause cam contact, a second flip-flop for detecting in combination with the pause cam contact whether a dialling number is the first one or the second one, a second gate for providing an output when the counted value of the counter is three and the second flip-flop indicates the first dialling number, a third flip-flop set when the counted value of the counter is one and the second flip-flop indicates the first dialling number, a third gate for providing an output when the counted value of the counter is four and the second flip-flop indicates the second dialling number, a fourth gate for providing an output when the outputs of the third gate and the third flip-flop are coincident with each other, and a fourth flip-flop set when an output is derived from either one of the second and fourth gates, whereby the generation of the dial impulses for the toll-dialling is prevented by the set output of the fourth flip-flop.

4. A dial device according to claim 3, further including a talking circuit, a dial pulse generator, a relay circuit having a slow-releasing characteristic and inserted in series with said talking circuit and said dial pulse generator, and a switching circuit, and in which the dial pulse generator generates an impulse by relaying through said switching circuit the logical product of the pulse counted result and the ON-OFF of the dial impulse contact, and wherein a contact of the relay circuit is inserted in series with the dial impulse contact.

* * * * *